(12) United States Patent
Nagasaka et al.

(10) Patent No.: US 6,395,382 B1
(45) Date of Patent: May 28, 2002

(54) SPONGE SHEET

(75) Inventors: Koji Nagasaka; Yasuoki Sasaki, both of Ibaraki; Shinichi Shimizu, Saitama, all of (JP)

(73) Assignee: Kanebo, Ltd., Tokyo (JP)

( * ) Notice: Subject to any disclaimer, the term of this patent is extended or adjusted under 35 U.S.C. 154(b) by 0 days.

(21) Appl. No.: 09/367,023

(22) PCT Filed: Feb. 17, 1998

(86) PCT No.: PCT/JP99/00630

§ 371 (c)(1),
(2), (4) Date: Oct. 12, 1999

(87) PCT Pub. No.: WO98/36855

PCT Pub. Date: Aug. 27, 1998

(30) Foreign Application Priority Data

Feb. 21, 1997 (JP) .............................................. 9-053920

(51) Int. Cl.⁷ ................................................. B32B 3/26
(52) U.S. Cl. ................................ 428/318.6; 428/316.6; 428/318.8; 428/319.3; 521/51; 156/77
(58) Field of Search ........................... 428/318.6, 318.8, 428/316.6, 315.7, 315.9, 319.9, 319.3

(56) References Cited

U.S. PATENT DOCUMENTS

| | | | | |
|---|---|---|---|---|
| 3,673,125 A | * | 6/1972 | Takahashi et al. | 260/2.5 F |
| 4,566,911 A | * | 1/1986 | Tomita et al. | 134/6 |
| 5,460,621 A | * | 10/1995 | Gertzman | 604/358 |
| 5,466,231 A | * | 11/1995 | Cercone et al. | 604/369 |
| 5,556,391 A | * | 9/1996 | Cercone et al. | 604/369 |

FOREIGN PATENT DOCUMENTS

| | | | |
|---|---|---|---|
| JP | 58-087133 | 5/1983 | |
| JP | 05-156069 | 6/1993 | C08J/9/26 |
| JP | 08-231754 | 9/1996 | |

* cited by examiner

*Primary Examiner*—Blaine Copenheaver
*Assistant Examiner*—Leanna Roché
(74) *Attorney, Agent, or Firm*—Hogan & Hartson, L.L.P.

(57) ABSTRACT

A polyvinyl acetal sponge sheet of a porous structure having fine continuous pores and a film on the surface thereof. This sponge sheet can be used for a wiping material for car washing which does not leave unwiped portions during wiping after car washing and has a small frictional resistance and a high working factor.

7 Claims, 1 Drawing Sheet

×100

×100

SPONGE SHEET

TECHNICAL FIELD

The present invention relates to a polyvinyl acetal sponge sheet having an improved wiping performance of water and, more particularly, to a polyvinyl acetal sponge sheet which is suited for use as a waste for removing water droplets on the surface of the car body and wiping the surface of a precision machine, machinery components, instrument or the like, and which is suited for wiping the human body.

BACKGROUND ART

A sponge made of a polyvinyl acetal porous elastic material has hitherto been used as a material for wiping water. Particularly, a sheet-shaped sponge made of a polyvinyl acetal porous elastic material, or a sheet-shaped article obtained by interposing reinforcing clothes between polyvinyl acetal porous elastic materials and integrating them into a composite has good water absorption capability and, therefore, it is employed as a wiping material for wiping to remove water droplets, dust, etc. on the surface of an article having comparatively good flatness. That is, it has already been commercialized as a waste for removing water droplets on the surface of the car body after car washing and wiping the surface of a precision machine, machinery components, instrument or the like.

However, in the case of coating the car body, several coats of paint have recently been applied on a rust resisting coat so as to obtain a beautiful body color. In a metallic coating, particularly, a clear coat of paint as a top coat layer is applied on a metallic layer, resulting in coat configuration of five or more layers including a prime coat.

This clear coat is liable to be scratched because it is comparatively soft, and often take fine scratches according to a manner of wiping water after car washing. Sometimes, in a severe case, luster of the coat is lost. For example, when the water absorption capability of a wiping cloth is insufficient, water can not be wiped completely at a time and the surface of the car body must be rubbed several times, thereby taking scratches. When unwiped water droplets are left on the coated surface, the water droplets cause the same action as that of convex lens on exposure to sunlight in a summer season, thereby burning the coated film, resulting in blotch.

Accordingly, when the car body is wiped after car washing, a flexible one having a soft surface is preferably used so as not to take scratches, and more preferred one has good water absorption properties and does not leave any unwiped portions after wiping. It is also important that the car body is not wetted by retaining once absorbed water in a material, that is, water retention properties are enhanced.

By the way, the reason why the polyvinyl acetal sponge sheet is used for wiping water as described above is as follows. That is, since the polyvinyl acetal sponge sheet has not only a larger water absorption capability than that of a conventional towel, but also a capability of vigorously sucking up water, water droplets can be removed only by contacting with them and it is not necessary to rub strongly like the towel.

Therefore, the present inventors have considered to make the sponge layer dense so as to enhance water absorption properties and water retention properties. However, it has been found that, although the above-mentioned polyvinyl acetal sponge sheet is generally used after previously dipping it in water and properly squeezing the wet sheet, when the sponge layer is made dense, frictional resistance and squeak on use are increased, thereby causing a problem such as low working factor.

Under these circumstances, the present inventors have intensively studied. As a result, they have found that a polyvinyl acetal sponge sheet having a specific structure can reconcile the water absorption properties and working factor on wiping after car washing, thus completing the present invention. An object of the present invention is to provide a sponge sheet suited for use as a material for car washing which does not leave unwiped portions during wiping after car washing and has a small frictional resistance and a high working factor.

DISCLOSURE OF THE INVENTION

The present invention provides a polyvinyl acetal sponge sheet comprising a polyvinyl acetal sponge layer on at least the surface thereof, and a film on at least part of the surface of said polyvinyl acetal sponge layer.

In the sponge sheet of the present invention, a pore opening percentage of the film is preferably from 10 to 60% and, more preferably, the polyvinyl acetal sponge layer is made of a polyvinyl acetal resin having an acetalization degree of 50 to 80% and is composed of a porous structure having fine continuous pores with an average pore diameter of 10 to 160 $\mu$m and a porosity of 80 to 95%.

The polyvinyl acetal sponge in the present invention refers to a porous structure having fine continuous pores which is obtained by a crosslinking polyvinyl alcohol and a pore-forming agent with aldehydes in the presence of a catalyst and removing the pore-forming agent.

According to one embodiment of the present invention, the water retention capability of the sponge can be enhanced by forming a film on the surface of the sponge. According to a second embodiment of present invention, there can be obtained a sponge sheet which is free from a squeak feel because the pore opening percentage of the film is from 10 to 60%, and which has high water retention capability. That is, when the pore opening percentage is smaller than 10%, the squeal feel on operation becomes strong. On the other hand, when the pore opening percentage exceeds 60%, the water retention capability is lowered and, therefore, once retained water is liable to spill on the coated surface, thereby leaving the unwiped portions. The term "pore opening percentage" of the film in the present invention refers to a proportion of pores, which constitute the structure of the porous material as the lower layer, exposed on the surface film layer on the sponge layer, in terms of a surface ratio. Pore opening percentage (%)=(are wherein pores are exposed)/(total surface area of porous material)×100.

The pore opening percentage of 100% means the state where no film exists on the surface of the porous material, while 0% means the state where the whole surface area is covered with the film.

According to the invention of claim 3, there can be obtained a sponge sheet having high flexibility and high water absorption properties. That is, the polyvinyl acetal sponge in the present invention has an acetalization degree of 50 to 80%. When the acetalization degree exceeds 80%, the resulting sponge is not suited for use because it is also hard on wetting with water.

An average pore diameter of the sponge sheet of the present invention is from 10 to 160 $\mu$m. When the average pore diameter is smaller than 10 $\mu$m, the squeak feel on operation becomes strong. On the other hand, when the average pore diameter exceeds 160 $\mu$m, the water absorption properties become worse and the water retention capability is lowered and, therefore, once retained water is liable to spill on the coated surface, resulting in low working factor.

A porosity of the sponge sheet of the present invention is from 80 to 95%. When the porosity is smaller than 80%, the above-mentioned water retention capability is lowered. On the other hand, the porosity exceeds 95%, the strength of the sheet is lowered, which is not preferred.

The sponge sheet of the present invention can be produced by the following manner. That is, the sponge sheet can be obtained by reacting a stock solution, which is prepared by mixing polyvinyl alcohol, aldehydes, acids and a fine powder of starches, in the state of being partitioned with a paper in a layered configuration, removing the unreacted aldehydes, acid sand fine powder of starch through washing with water after the completion of the reaction, and separating at the portion of the above-mentioned paper as a separator.

The polyvinyl alcohol used in the present invention may be completed or partially saponified one having a polymerization degree of 300 to 2000, wherein part of hydroxyl groups is substituted with the other functional group, and these polyvinyl alcohols can be used alone or in combination thereof.

The aldehydes used in the present invention act as an aliphatic or aromatic crosslinking agent capable of converting polyvinyl alcohol into polyvinyl acetal, which may also be monohydric or polyhydric. Particularly, formaldehyde and acetaldehyde are preferred to afford physical properties as the polyvinyl acetal porous material.

The salts used in the present invention are those acting as a catalyst and there can be used, for example, mineral acids such as hydrochloric acid, sulfuric acid, nitric acid, etc.; organic acids such as oxalic acid, citric acid, maleic acid, etc.; or salts of a strong acid and a weak base, which are acidic in an aqueous solution.

The fine powder of starches used in the present invention refers to a granular material (starch granules) obtained by separation/extraction of plants, and plants from which starched are derived include, for example, grains such as rice, wheat, corn, etc.; and corns such as potato, sweet potato, taro, etc. A so-called modified starch powder obtained by incorporating a hydrophobic functional group into hydroxyl groups of these starch granules may also be used. This fine powder of starches acts as a pore-forming agent in the production of the polyvinyl acetal porous material, and the pore diameter and porosity can be adjusted by changing the kind and amount of the starch.

The paper used in the present invention is used as a separator, and is preferably a paper which is completely disintegrated and dispersed after the completion of the reaction and which does not contain a binder, an additive or the like. In order to obtain a sponge sheet having a predetermined pore opening percentage, those having fixed water penetration properties are used. That is, those having a water penetration time required to penetrate 500 ml of water through a paper having a fixed area within a proper range are used. When the water penetration time is long, the pore opening percentage of the sponge sheet becomes small. On the other hand, when the water penetration time is short, the pore opening percentage becomes large.

BEST MODE FOR CARRYING OUT THE INVENTION

Figure 1:
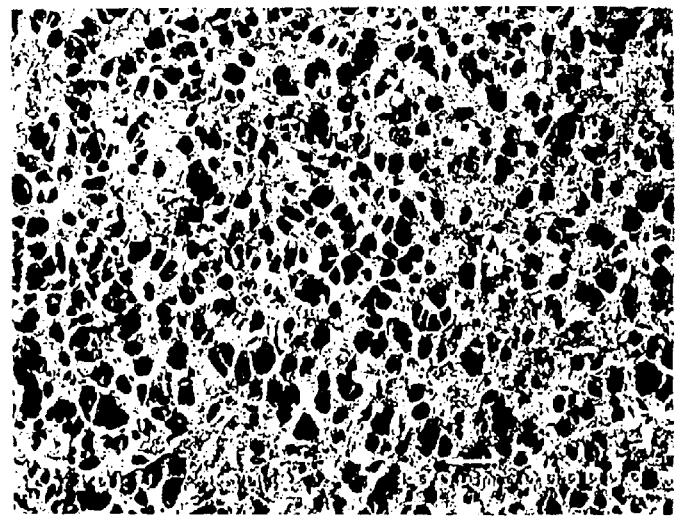
FIG. 1 is a SEM micrograph showing a surface shape of a film of the sponge sheet according to the present invention.
Figure 2:
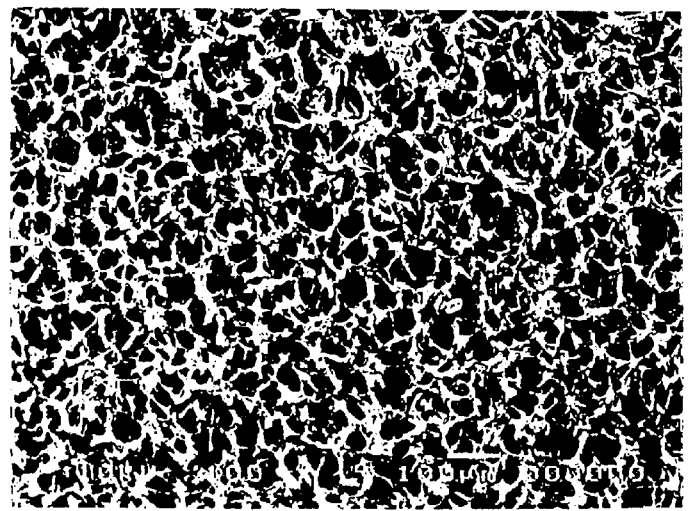
FIG. 2 is a SEM micrograph showing a three-dimensional network inside the sponge sheet according to the present invention.

The following Examples further illustrate the present invention but are not to be construed to limit the scope thereof.

The sponge sheet as one embodiment of the present invention will be described below.

A method of producing the sponge sheet of the present invention will be described in detail below. First, polyvinyl alcohol was dissolved in hot water to prepare an aqueous polyvinyl alcohol solution having a concentration of about 5 to 15% by weight. To the resulting solution, a solution prepared by dispersing a starch as a pore-forming agent in water is added. This solution is heated to around a gelatinization temperature of the starch, followed by the addition of sulfuric acid and an aqueous solution of formaldehyde and further sufficient mixing with stirring to form a homogeneous slurry stock solution.

A fixed amount of this stock solution is cast into a predetermined retaining mold. A paper is placed thereon and then a fixed amount of the stock solution is further casted. When an operation of alternatively casting the paper and stock solution is repeated in the same manner, several layers each separated by a paper as a separator are laminated.

The laminate is reacted as it is at about 60° C. for 10 hours or more. After the completion of the reaction, when the resultant is pressed and washed with water, the unreacted aldehydes, acids and fine powders of starches are removed. Then, a sponge sheet of the polyvinyl acetal porous material of the present invention is obtained by separating at the portion of the paper.

When cloths are placed after casting the stock solution and then the stock solution is casted again, a sponge sheet comprising cloths interposed as a reinforcing material can be obtained.

The cloths used in this case are preferably porous cloths such as victoria lawn, capable of integrating with polyvinyl acetal porous materials at both sides.

EXAMPLE 1

750 g of a completely saponified polyvinyl alcohol 117 manufactured by Kuraray Corp. was dissolved in hot water to make 8 liter in the total amount. Corn starch particles were selected as a pore-forming material and 700 g of corn starch particles were dispersed in water. The resulting suspension was added to the above-mentioned aqueous polyvinyl alcohol solution, followed by mixing with stirring to make 10 liter in the total amount.

Formaldehyde was selected as a crosslinking agent, while sulfuric acid was selected as a catalyst. A mixed solution of 1 liter of 35% formalin and 1 liter of 50% sulfuric acid was added to the above mixed solution of polyvinyl alcohol and starch to prepare a homogeneous mixed solution, which was taken as a reaction stock solution.

A resin container having a size of 780 mm in length×490 mm in width×100 mm in depth was prepared and then the reaction stock solution and papers as a separator were alternatively charged therein to form layers. In this case, the amount of the reaction solution to be casted in one layer is adjusted to 600 ml and a paper having a water penetration time of 170 seconds was used as the paper. That is, lamination was conducted in such a manner that each layer of the reaction stock solution was completely isolated by using a paper having the same as or slightly smaller than that of the above-mentioned container, thereby to form a plurality of layers.

After the completion of the lamination, the container was put in a heat treatment equipment controlled to a temperature of 60° C. and the reaction was conducted around overnight.

After the completion of the reaction, the contents were taken out from the container and sufficiently washed with water to remove the unreacted formaldehyde, sulfuric acid and starch. Furthermore, the reaction product was divided at the portion of the paper to obtain each sponge sheet having a thickness of about 1.5 mm. The sponge sheet had a film on the surface. The properties and various characteristics of the resulting sponge sheet are as shown in Table 2.

Water droplets were scattered on the surface of a plate having the same smoothness as that of the coated surface of a car and then wiped by using the resulting sponge sheet, resulting in small frictional resistance, no squeak, high working factor and no unwiped portions.

The method for evaluation of the characteristics of the sponge sheet will be shown below.

(Measurement of frictional resistance value)

In the present invention, the frictional resistance value quantitatively represents ease of wiping. Specifically, it is determined by the following manner. A sponge sheet having a size of 100 mm×100 mm is applied on the bottom surface of a plastic case having the same size bottom surface, using a double-coated tape, and a weight of 1.2 kg is placed uniformly on the case. After placing the sponge sheet down on a smooth plate, the side of the case is fixed to a spring scale. When the spring scale is pulled horizontally and the sponge sheet attached to the case starts to move, a load of the spring scale is read. When the load is not more than 3.0 kg, it is judged that the resistance on operation is small. On the other hand, when the load is not less than 3.0 kg, it is judged that the resistance on operation is large and the squeak feels exits.

(Water Absorption Capability and Presence/Absence of Unwiped Portions)

After water colored by using a blue pigment is sprayed on a white board, a sponge sheet having a size of 100 mm×100 mm is placed thereon in a twice-folded state and the sponge sheet is gently pulled by using a plastic ruler contacted with the sponge sheet. In that case, the amount of water droplets left on the white board is judged.

EXAMPLES 2, 3

In the same manner as in Example 1, except for changing the water penetration time of the paper used in Example 1 to 100 seconds or 80 seconds, a sponge sheet having a thickness of 1.5 mm was obtained, respectively.

EXAMPLE 4

In the same manner as in Example 1, except for changing the starch used in Example 1 to a rice starch, a sponge sheet having a thickness of 1.5 mm was obtained.

EXAMPLE 5

In the same manner as in Example 1, except for changing the starch used in Example 1 to a potato starch, a sponge sheet having a thickness of 1.5 mm was obtained.

COMPARATIVE EXAMPLE 1

In the same manner as in Example 1, except for changing the water penetration time of the paper used in Example 1 to 500 seconds, a sponge sheet having a thickness of 1.5 mm was obtained.

COMPARATIVE EXAMPLES 2,3

In the same manner as in Comparative Example 1, except for changing the starch used in Comparative Example 1 to a rice starch or a potato starch, a sponge sheet having a thickness of 1.5 mm was obtained, respectively.

COMPARATIVE EXAMPLE 4

In the same manner as in Comparative Example 1, except for changing the water penetration time of the paper used in Comparative Example 1 to 50 seconds, a sponge sheet having a thickness of 1.5 mm was obtained.

With respect to Examples 1 to 5 and Comparative Examples 1 to 4, the results of the above-mentioned evaluation methods are shown in Table 2. Incidentally, the production conditions are summarized in Table 1.

TABLE 1

| Item | Average pore diameter, $\mu$m | Kind of starch | Porosity (%) | Water penetration time (seconds) |
|---|---|---|---|---|
| Example 1 | 50 | Corn starch | 88 | 170 |
| Example 2 | 50 | Corn starch | 88 | 100 |
| Example 3 | 50 | Corn starch | 88 | 80 |
| Example 4 | 20 | Rice starch | 86 | 170 |
| Example 5 | 100 | Potato starch | 92 | 170 |
| Comp. Example 1 | 50 | Corn starch | 88 | 500 |
| Com. Example 2 | 20 | Rice starch | 86 | 500 |
| Com. Example 3 | 100 | Potato starch | 92 | 500 |
| Com. Example 4 | 50 | Corn starch | 88 | 50 |

TABLE 2

| Item | Pore opening percentage (%) | Friction resistance value (kg) | Working factor | Presence/absence of unwiped portions | Evaluation |
|---|---|---|---|---|---|
| Example 1 | 18 | 2.6 | High | None | o |
| Example 2 | 36 | 2.4 | High | None | o |
| Example 3 | 49 | 2.2 | High | Little | o |
| Example 4 | 18 | 2.8 | High | None | o |
| Example 5 | 18 | 2.1 | High | Little | o |
| Comp. Example 1 | 6 | 3.4 | Low | None | x |
| Comp. Example 2 | 6 | 3.6 | Low | None | x |
| Comp. Example 3 | 6 | 3.2 | Low | None | x |
| Comp. Example 4 | 70 | 2.1 | High | Some unwiped portions are left | x |

As is apparent from Table 2, when the pore opening percentage of the film on the surface of the sponge sheet exceeds 60%, some unwiped portions are left and, on the other hand, when the pore opening percentage is not more than 10%, the working factor becomes low.

INDUSTRIAL APPLICABILITY

The sponge sheet of the present invention can afford a wiping material for car washing which has a high working factor and does not leave unwiped portions by setting a pore opening percentage of a film on the surface of the sponge sheet within an optimum range. This sponge sheet can also be used for wiping water on the human body after swimming.

We claim:

1. A polyvinyl acetal sponge sheet comprising a polyvinyl acetal sponge layer on at least the surface thereof, and an integrally formed film of polyvinyl acetal having a pore opening percentage of from 10 to 60% on the surface of said polyvinyl acetal sponge.

2. The sponge sheet according to claim 1, wherein the polyvinyl acetal sponge layer is made of polyvinyl acetal resin having an acetalization degree of 50 to 80% and is composed of a porous structure having fine continuous pores with an average pore diameter of 10 to 160 $\mu$m and a porosity of 80 to 95%.

3. The sponge sheet according to claim 1, wherein a thickness of the sponge sheet is not more than 3 mm.

4. The sponge sheet according to claim 1, which is produced by interposing cloths as a reinforcing material.

5. A method of producing a sponge sheet having 10–60% pore openings, which comprises reacting a stock solution prepared by mixing polyvinyl alcohol, aldehydes, acids and fine powders of starches, partitioning with paper separators to form a plurality of layers, washing the reaction product with water to remove the unreacted aldehydes, acids and fine powders of starches as well as gelatinized starches after the completion of the reaction, and separating the layers wherein each layer has an integral polyvinyl acetal skin formed in contact with one of the separators.

6. The method of producing a sponge sheet according to claim 5, wherein a water penetration time of the paper as the separator is from 60 to 450 seconds.

7. The method of producing a sponge sheet according to claim 5, wherein a water penetration time of the paper as the separator is from 80 to 170 seconds.

* * * * *